Dec. 8, 1959  J. B. EAGLESTON  2,916,602
METHOD FOR CLADDING STEELS OF DIFFERENT COMPOSITIONS
Filed Dec. 26, 1957
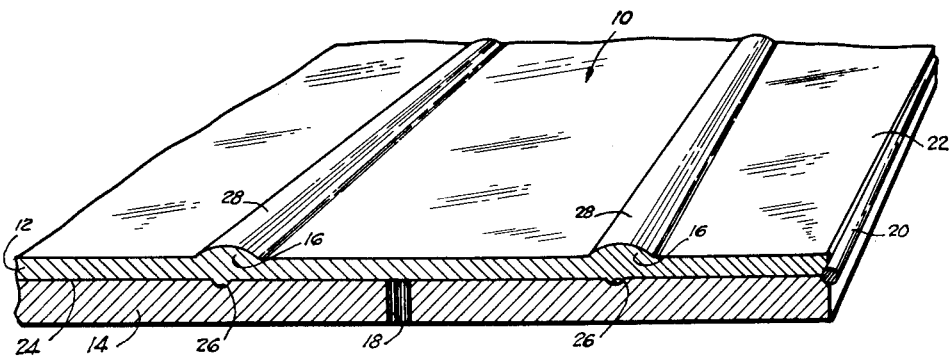
INVENTOR.
Joe B. Eagleston
BY
ATTORNEY United States Patent Office 2,916,602
Patented Dec. 8, 1959

2,916,602

METHOD FOR CLADDING STEELS OF DIFFERENT COMPOSITIONS

Joe B. Eagleston, Houston, Tex.

Application December 26, 1957, Serial No. 705,439

4 Claims. (Cl. 219—76)

This invention relates to a method for uniting metallic materials of different composition, and more particularly, but not by way of limitation, to a method for cladding carbon steel with stainless steel, and the like.

In the manufacture of certain types of pressure vessels and the like, particularly for use in the chemical industry, it is desirable to line or coat the vessel with a suitable non-corrosive material in order to withstand the reaction of the chemicals. Stainless steel and Monel metals are frequently selected for this purpose because of their non-corrosive and resistant characteristics. It is normally necessary to unite or integrate the stainless steel with the carbon steel from which the vessel is constructed. The characteristics and composition of the carbon steel and stainless steel are different and as a result, it is difficult to unite the two materials satisfactorily. One common method in use today for combining or uniting the two materials, or constructing a laminated plate thereof, consists of placing a plate of stainless steel metal on top of a carbon steel plate and clamping the two together by a variety of means, such as clamping rollers, which include the submerged arc welding apparatus for providing the welding operation between the two plates in such a manner that the clamped rollers move simultaneously with the arc welding apparatus. In another method of manufacturing the laminated plate, the two metal plates may be placed in a suitable bending roll apparatus for holding the plates tightly together and then applying the arc welding. One of the main disadvantages of these types of methods is that the extreme or intense heat of the welding operation will cause the stainless steel plate to buckle, and since there is no way to control the buckling, there will usually not be a complete uniting of the two plates.

The present invention contemplates a novel method for applying the stainless steel liner which is comparable to cladding the carbon steel plate by a new method for holding the stainless steel plate adjacent the carbon steel plate. The method comprises drilling a hole through the carbon plate and then welding the stainless and carbon plates together at the perimeter thereof to provide a seal weld around the outer periphery or edges between the two plates, thereby uniting them together in the first step of the process. The second step in the method is to create a vacuum between the plates by providing enough suction through the aperture for drawing out substantially all the air that may be present between the upper stainless plate and the lower carbon plate, and at the same time holding the stainless plate in a fixed position firmly against the carbon plate. The plates are then welded together by a suitable submerged arc welding operation while simultaneously maintaining the vacuum between the plates throughout the welding operation. The creation of the vacuum controls the heat during the welding operation in order to prevent detrimental buckling of the stainless steel plate. In addition, the atmospheric pressure acting on the top surface of the stainless steel plate and against the vacuum pressure working on the underside thereof prevents buckling during the welding operation.

It is an important object of this invention to provide an improved method for the laminating of metallic materials of different characteristics and compositions.

It is another object of this invention to provide a novel method for cladding carbon steel with stainless steel, or the like, in a manner whereby the detrimental buckling of the stainless steel during the welding operation is eliminated.

Another object of this invention is to provide a novel method for cladding carbon steel with stainless steel, or the like, in a manner whereby the heat of the welding operation may be controlled in order to reduce the detrimental effect thereof.

A further object of this invention is to provide a novel method for cladding carbon steel with stainless steel, or the like, in a manner which is efficient and economical.

Other objects and advantages of the invention will be evident from the following detailed description, read in conjunction with the accompanying drawing, which illustrates my invention.

In the drawing:

The sole figure is a broken perspective view of a carbon steel and stainless steel plate laminated in accordance with the present invention.

Referring to the drawing in detail, reference character 10 generally indicates a laminated plate structure comprising an upper metallic plate 12 united with a lower metallic plate 14. The upper plate 12 is preferably of a suitable stainless steel or Monel metal which is non-corrosive. The lower plate 14 is preferably of a suitable carbon steel construction. The two plates 12 and 14 are united by means of a plurality of submerged arc welds 16 in a manner as will now be set forth.

The carbon steel plate 14 is provided with at least one, but not limited thereto, aperture 18 extending through the plate. It will be apparent that a plurality of the apertures 18 may be provided in the plate 14 and spaced as determined with the positions of the welds 16. The stainless steel plate 12 is then placed on top of the plate 14 and clamped thereto in any well known manner (not shown). A suitable weld 20 is then provided around the outer periphery of the plates 12 and 14 at the adjacent edges thereof for providing a seal weld therebetween. The plates 12 and 14 are thus initially united in the first step of the process.

A suitable vacuum pump or the like (not shown) is connected to the aperture 18 for supplying sufficient suction thereto for drawing or pulling out substantially all the air which may be present between the plates 12 and 14. In this manner, a vacuum is created therebetween whereby the atmospheric pressure acting on the upper surface 22 of the stainless steel plate 12 and against the vacuum on the under surface 24 thereof tightly positions the upper plate 12 against the lower plate 14. During this operation, the plates 12 and 14 are clamped together in any suitable manner (not shown) in order to assure a tight engagement therebetween as the vacuum is created.

The plates 12 and 14 may then be welded together or provided with the welds 16 by any well known welding process. However, a submerged arc weld process is preferable. The process of withdrawing the air from between the plates 12 and 14 is continued in order to control the heat or dissipate the heat during the welding process, and thus preclude buckling of the stainless steel plate 12. The vacuum will not pull the molten pool of the weld out of the weld position, but the molten pool will be maintained in position for cooling in order to unite the plates 12 and 14 together. The depth of the submergence 26 of the weld 16 into the carbon plate, as well as the crown portion 28 of the weld 16 on the stainless plate 12 may be varied as desired by the amperage and voltage utilized in the arc welding operation, as is well known.

Upon a cooling of the plates 12 and 14 after the welding operation, the plate 10 will be laminated to provide a united construction between the non-corrosive stainless steel metal and the carbon steel material. The carbon steel plate 14 will be efficiently clad with the stainless steel plate 12, and the stainless steel plate 12 will not be buckled by the heat of the welding operation. Thus, the uniting of the carbon steel and stainless steel has been completed.

From the foregoing, it will be apparent that the present invention provides an efficient and economical method for laminating metallic plates of dissimilar compositions. The creation of a vacuum between the adjacent plate members greatly improves the results of the cladding operation by eliminating any buckling of the stainless steel material from the intense heat of the welding process. In addition, the heat from the welding operation is controlled by the continued creation of a vacuum during the welding of the plates.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. The method of manufacturing laminated sheets which consists of placing a non-corrosive sheet adjacent a sheet of dissimilar composition, withdrawing the air between the sheets to provide a vacuum therebetween and assure a tight engagement therebetween, and uniting the sheets by welding to provide a laminated sheet.

2. The method of manufacturing laminated sheets which consist of placing a non-corrosive metal sheet adjacent a metal sheet of dissimilar composition, providing a seal between the adjacent edges of the two sheets, withdrawing the air between the sheets to provide a vacuum therebetween and assure a tight engagement therebetween, and uniting the sheets by welding thereof to provide a laminated sheet.

3. The method of making laminated metallic plates which consists of placing a non-corrosive metallic plate on top of a carbon steel plate, welding the outer periphery of the plates at the adjacent edges thereof to provide a seal between the plates, withdrawing the air between the plates to provide a vacuum therebetween, welding the two plates together for a uniting thereof, continuing the withdrawing of the air from between the plates during the welding thereof for controlling the heat and precluding buckling of the non-corrosive plate, and permitting the plates to cool to provide a laminated plate.

4. A method of making laminated metallic plates which consists of placing a non-corrosive metallic plate on top of an apertured carbon steel plate, clamping the two plates together, welding the outer periphery of the plates at the adjacent edges thereof to provide a seal therebetween, withdrawing the air between the plates through the apertures to provide a vacuum between the plates, welding the plates together by a submerged arc welding process, continuing withdrawing of the air between the plates druing the welding operation for controlling the heat therefrom and precluding buckling of the non-corrosive metallic plate, and permitting the welds to cool to provide a united non-corrosive and carbon steel plate.

References Cited in the file of this patent

UNITED STATES PATENTS

| | | |
|---|---|---|
| 1,223,777 | Eky | Apr. 24, 1917 |
| 2,054,939 | Larson | Sept. 22, 1936 |
| 2,219,352 | Andrus | Oct. 29, 1940 |